United States Patent [19]
Arshad

[11] Patent Number: 6,108,757
[45] Date of Patent: *Aug. 22, 2000

[54] METHOD FOR LOCKING A SHARED RESOURCE IN MULTIPROCESSOR SYSTEM

[75] Inventor: Muhammad Arshad, Reynoldsburg, Ohio

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/808,921

[22] Filed: Feb. 28, 1997

[51] Int. Cl.⁷ .................................................. G06F 12/00
[52] U.S. Cl. ........................... 711/152; 711/151; 711/147
[58] Field of Search ............................. 395/726, 200.59; 711/163, 152, 154, 151, 150, 147

[56] References Cited

U.S. PATENT DOCUMENTS

| | | | |
|---|---|---|---|
| 4,574,350 | 3/1986 | Starr | 395/726 |
| 4,709,326 | 11/1987 | Robinson | 364/200 |
| 5,226,143 | 7/1993 | Baird et al. | 711/14 |
| 5,237,694 | 8/1993 | Horne et al. | 395/725 |
| 5,243,596 | 9/1993 | Port et al. | 370/231 |
| 5,253,344 | 10/1993 | Bostick et al. | 395/275 |
| 5,263,146 | 11/1993 | Mishima | 395/425 |
| 5,276,847 | 1/1994 | Kohn | 395/425 |
| 5,285,528 | 2/1994 | Hart . | |
| 5,289,588 | 2/1994 | Song et al. | 395/447 |
| 5,339,427 | 8/1994 | Elko et al. | 709/103 |
| 5,341,491 | 8/1994 | Ramanujan | 711/152 |
| 5,353,414 | 10/1994 | Iida et al. | 395/288 |
| 5,408,629 | 4/1995 | Tsuchiya et al. | 711/151 |
| 5,430,860 | 7/1995 | Capps, Jr. et al. | 395/425 |
| 5,442,755 | 8/1995 | Shibata | 395/325 |
| 5,502,840 | 3/1996 | Barton | 395/726 |
| 5,524,212 | 6/1996 | Somani et al. | 395/200.08 |
| 5,535,365 | 7/1996 | Barriuso et al. | 711/155 |
| 5,553,267 | 9/1996 | Herlihy | 395/474 |
| 5,566,319 | 10/1996 | Lenz | 711/152 |
| 5,574,922 | 11/1996 | James | 395/561 |
| 5,623,671 | 4/1997 | Ando et al. | 395/726 |
| 5,729,749 | 3/1998 | Ito | 710/200 |
| 5,761,659 | 6/1998 | Bertoni | 707/8 |
| 5,860,126 | 1/1999 | Mittal | 711/167 |
| 5,875,485 | 2/1999 | Matsumoto | 711/152 |

OTHER PUBLICATIONS

"Hardware Support For Release Consistency with Queue–Based Synchronization", Lee et al., Parallel and Distributed Systems, International Conference on Computer Architecture, pp. 141–151, 1997.

Primary Examiner—John W. Cabeca
Assistant Examiner—Pierre-Michel Bataille
Attorney, Agent, or Firm—Mony R. Ghose

[57] ABSTRACT

A method for efficiently acquiring and releasing a shared locking mechanism in a multiprocessor environment comprises updating variables associated with the locking mechanism and variables associated with processors seeking to acquire the lock. If the lock is currently occupied, a processor waits in accordance with information initialized in a spin variable associated with the processor. Upon releasing the lock, a relinquishing processor determines whether there are other processors waiting to acquire the lock. If other processors are waiting to acquire the lock, the relinquishing processor alters a successor variable associated with the waiting processor in the waiting processor's local shared memory so that the lock mechanism can be passed on and a first-in and first-out behavior of a waiting queue can be maintained.

1 Claim, 6 Drawing Sheets

METHOD FOR LOCKING A SHARED RESOURCE IN MULTIPROCESSOR SYSTEM

CROSS REFERENCE TO RELATED APPLICATION

This application is related to the application of Muhammad Arshad entitled "Method For Accessing A Shared Resource In A Multiprocessor System", which application is assigned to the assignee of the present application, and is being filed concurrently herewith.

TECHNICAL FIELD

This invention relates to a system for accessing resources shared by a plurality of processors. More particularly, the invention relates to a method for efficiently accessing a shared memory in a multiple processor computing environment.

BACKGROUND OF THE INVENTION

A data "structure" refers to related data stored in a computer memory location. To enhance operating efficiency, a data structure may be "shared" by a plurality of processors which require the same information to perform various tasks. Synchronizing access to a shared data structure is a great challenge in designing software for computers with multiple processors, and is especially important whenever multiple processors attempt to update information in a data structure. Indeed, without efficient synchronization, the performance of a system including a shared data structure is severely degraded. This is because when one processor performs a data structure update, it is common for the entire data structure to be inaccessible (or "locked") to other processors. In other words, the non-updating processors must wait until the data structure is "unlocked" before the information contained in the structure can be accessed or updated. Another significant problem affecting the performance of a multiprocessor environment with shared resources is the inability of multiple processors to simultaneously perform updates on discrete data structure events without blocking each other.

The lack of synchronization in multiprocessor environments also contributes to the loss of first-in, first-out (hereinafter, FIFO) behavior during data structure updates resulting in the data structure being left in an "inconsistent" state. For example, assume a first processor begins modification of a data structure while a second processor waits to modify the structure. During an interval in which the first processor is in the process of unlocking the data structure, a third processor seizes the structure and performs its own information update. As a result, the third processor's updates are performed prior to the second processor's updates and the FIFO behavior of the data structure modification is destroyed. As is well-established, the loss of FIFO behavior during data structure modification results in significant performance degradation of multiprocessor systems.

Therefore, there is a need for an efficient, non-blocking operation for updating shared data structures in a multiprocessor environment.

SUMMARY OF THE INVENTION

This need is addressed and a technological advance is made in the art by the present invention which provides a contention-free lock in a multiprocessor environment. More particularly, the present invention uses information in variables associated with a locking mechanism to enable multiple processors to access the lock.

In the preferred embodiment, a processor initializes a successor variable and a spin variable within its own local shared memory prior to attempting to access a locking mechanism stored in a global shared memory. The locking mechanism is comprised of a tail variable and a head variable wherein the tail stores an address associated with the last processor in a queue for occupying a lock. The processor which seeks to acquire a lock determines whether the lock is free and, upon a determination that the lock is occupied, waits for the lock to become available in accordance with directions set in the spin variable located in the local shared memory. When the lock mechanism is released by a processor, the processor determines whether there is another processor which desires to access the lock. If it is determined that there is another processor waiting to acquire the lock, the processor relinquishing the lock passes the lock to the waiting processor by updating a variable in the waiting processor's local shared memory.

Advantageously, multiple processors acquire the locking mechanism on a first-in, first-out process which is dependent upon updating information contained in variables associated with the locking mechanism. Further, when a processor relinquishes the lock, it automatically is directed to the next waiting processor in the acquisition queue via information contained in a variable in the locking mechanism.

DETAILED DESCRIPTION

Figure 1:
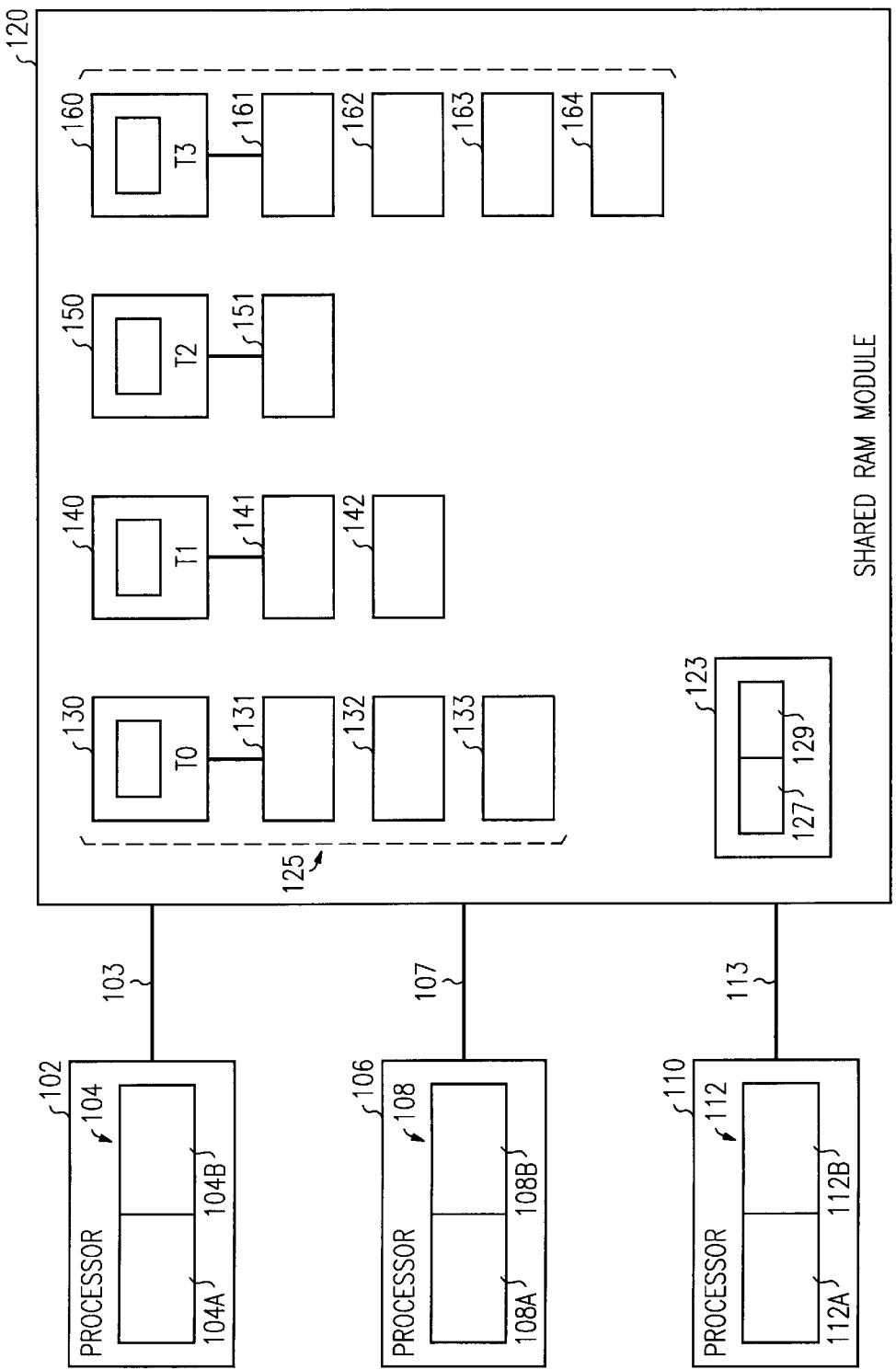
FIG. 1 is a simplified block diagram of an exemplary multiprocessor environment including a shared local memory in which the preferred embodiment of the present invention may be practiced.

FIG. 1 is a simplified block diagram illustrating a multiprocessor environment in which the preferred embodiment of the present invention may be practiced. Multiprocessor environment 100 is disposed in a computer system and comprises processors 102, 106, 110 and shared random access memory (RAM) module 120 which are linked by designated data links. In this embodiment, each processor includes a dual register memory for storing instructions and data relating to update operations. More particularly, processor 102 includes first register 104A, second register 104B and is linked to RAM module 120 via data link 103. Similarly, processor 106 includes first register 108A, second register 108B and data link 107. Processor 110 includes first register 112A, second register 112B and is linked to the RAM module via data link 113. In the preferred embodiment, the first register in each processor stores address information identifying a particular time based data event. The second register stores data associated with the "queue" variable of the time based data event, as described below.

Local shared RAM module 120 stores data structures which are accessed by processors 102, 106 and 110 for performing various tasks. Although only three processors are shown in this particular environment, those skilled in the art will recognize that many more processors may be coupled to a local shared memory. Also, for purposes of clarity, only a single data structure 125 is shown within RAM module 120. Operational shared memories may contain many more data structures.

Data structure 125 is comprised of four data events which occur at four discrete time periods. Each time-based data event occurs at a predefined time (e.g., T0, T1, T2 or T3) and is linked with a plurality of subevents which occur concurrently during the predefined time. More particularly, data event 130 occurs at time "T0" and has a linked list of a plurality of subevents (that is, subevents 131, 132 and 133) which occur simultaneously at time T0. Similarly, data event 140 occurs at time T1 along with subevents 141 and 142. Data event 150 occurs at time T2 along with subevent 151. Data event 160 occurs at time T3 concurrently with subevents 161, 162, 163 and 164.

Time based data events 130, 140, 150 and 160 include predetermined update variables which are accessed whenever modification of data structure 125 is attempted. More particularly, each time based data event includes a "queue" variable for identifying the temporal location of the data event, a pointer to the next time-based data event in the data structure and a pointer to the linked list of subevents associated with the data event. For example, the queue variable associated with data event 130 contains data identifying time T0, a pointer to the next data event (namely, data event 140) and a pointer to the linked list of subevents 131, 132 and 133. In this embodiment, the queue variable is stored in a specified portion of each time based data event. More particularly time based data events 130, 140, 150 and 160 store their respective queue variables in data memory portions 135, 145, 155, and 165, respectively.

Shared RAM module 120 also includes a memory for retaining addresses of each data structure stored in the module and a queue variable relating to the first time based data event of each data structure. In this embodiment, "head" segment 123 stores its own address information in first register 127, and a queue variable in second register 129. During an update operation, head segment 123 is accessed prior to attempting insertion of a new time based data event or a new subevent in data structure 125.

Figure 2:
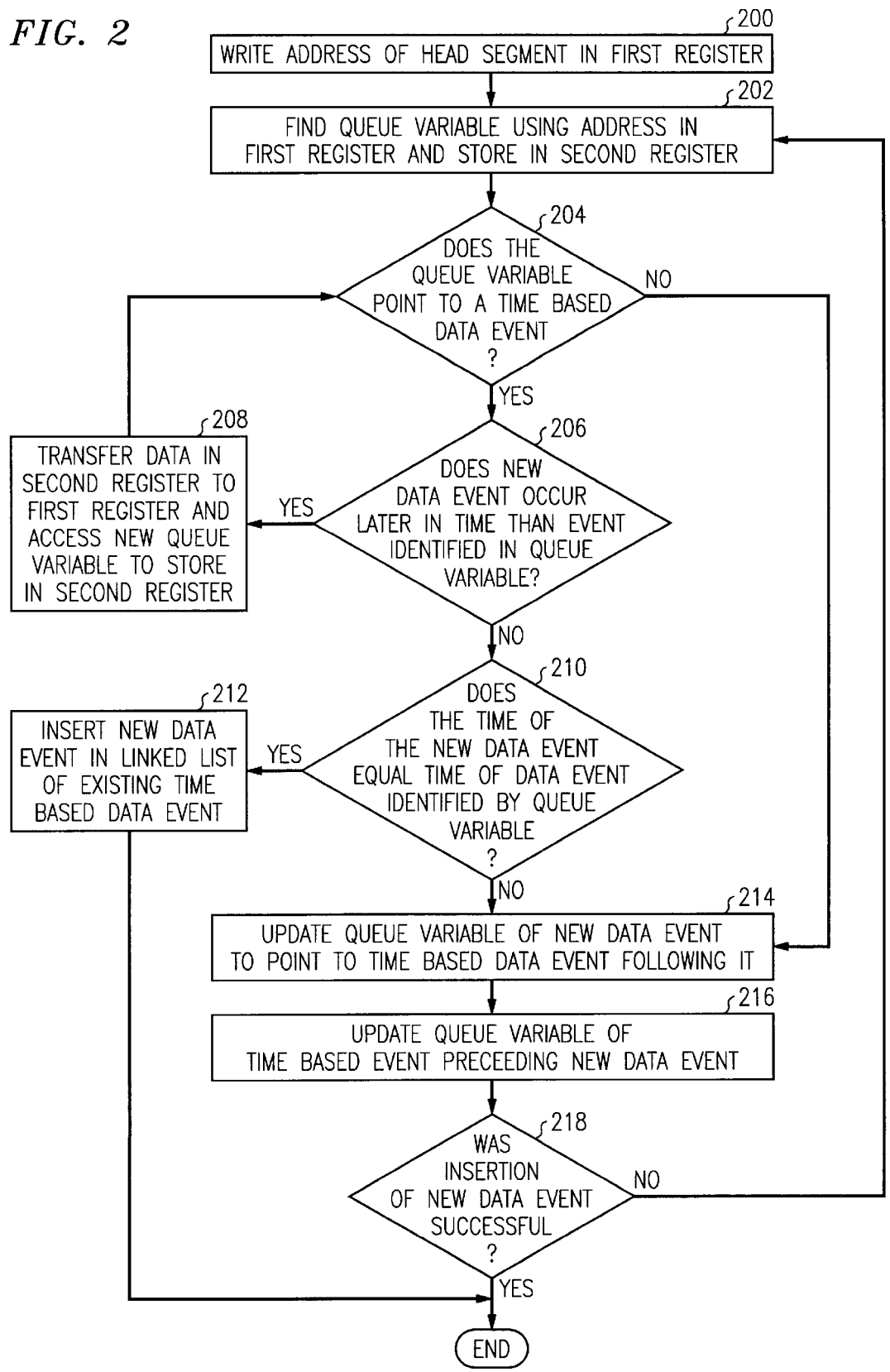
FIG. 2 is a flow diagram illustrating the steps for concurrent, non-blocking modification of the data structure stored in the shared local memory shown in FIG.

FIG. 2 is a flow diagram illustrating the steps performed in multiprocessor environment 100 for updating data structure 125. For purposes of example, assume that processor 102 needs to update data structure 125 by inserting a new time based data event between existing time based data events 140 and 150. In other words, a new time based data event occurring at time T12 must be inserted between the time based data events which now occur at times T1 and T2. In an alternative embodiment, processor 102 inserts a new subevent in a linked list associated with an existing time based data event. All embodiments use a non-blocking procedure (that is, multiple processors may update data structure 125 simultaneously as long as no two processors attempts to insert a new event in exactly the same place) which uses readily-available machine operations for updates.

The process begins in step 200 in which processor 102 writes the address location of head segment 123 in its first register 104A. In this example, shared RAM module 120 only contains a single data structure (i.e., data structure 125).

In alternative embodiments, processor 102 is initialized with information enabling it to access the register within head segment 123 relating to the data structure which it needs to update. The process continues to step 202 in which the processor reads the queue variable information stored in second register 129 and writes the data associated with the queue variable in its second register 104B. The queue variable contains information which points to the first time based data event associated with data structure 125. In some circumstances, there is no existing data structure for the processor to update. In those circumstances, the queue variable in head segment 123 indicates that there is no time based data event associated with the address location stored in the second register such that the processor may insert new time based data events without regard to existing time based data events. In this example, data structure 125 is populated with multiple time based data events such that processor 102 must perform updates which take into consideration existing data events.

The process continues to decision step 204 in which processor 102 determines whether there is a time base data event indicated by the queue value which is currently stored in its second register 104B. In this example, the queue value stored in second register 104B points to first time based data event 130 in data structure 120. In those circumstances in which there are no time based data events stored in a data structure, the outcome of decision step 204 is a "NO" determination and the process continues to step 214 as described below. If the outcome of decision step 204 is a "YES" determination, the process continues to decision step 206 in which processor 102 determines if the time of the new event (that is, the event to be inserted by processor 102) occurs later than the time of the event which is identified by the information contained in the queue value stored in second register 104B. In other words, processor 102 determines whether the new event occurs later in time than the time based data event identified by the queue value currently stored in second register 104B. Recall that the queue value now stored in register 104B was retrieved from head segment 123 and identifies first time based data event 130. In this example, the new event is to be inserted between time based data events T1 and T2. Therefore, the outcome of decision step 206 is a "YES" determination and the process continues to step 208 in which processor 102 transfers the information currently stored in second register 104B to first register 104A. Processor 102 then uses the pointer stored in processor 104A to access the next time based data event. The queue variable found in the next time based event is then read and copied to second register 104B. In this example, processor 102 transfers the queue variable information from second register 104B to first register 104A. The queue variable information currently stored in first register 104A points to memory 135 in first time based data element 130 in data structure 125. The queue variable stored in memory 135 is read and assigned to second register 104B in processor 102. The process then returns to step 202 so that the procedure may be reiterated until the outcome of decision step 206 is a "NO" determination. A "NO" determination resulting from decision step 206 indicates that the processor has arrived at the point in data structure 125 at which the new time based data event no longer occurs later in time than the event currently identified by the queue variable stored in second register 104B. In this example, a "NO" outcome from decision step 206 would indicate that second register 104B of processor 102 stores the queue variable associated with second time based data event 140 which identifies third time based data event 150. In other words, the new time based data event to be inserted does not occur later in time than third time based data event 150. Receipt of a "NO" determination from decision step 206 requires the process to proceed to decision step 210 in which processor 102 determines whether the time of the new event to be inserted into the data structure occurs at the same time as the event identified in second register 104B. In other words, in decision step 210, processor 102 determines whether the new data event to be inserted into data structure 125 corresponds to an existing time based data event. If the outcome of decision step 210 is a "YES" determination, the process continues to step 212 in which the new event is inserted into the linked list of an existing time based event and the process ends in step 220. In this example, however, processor 102 endeavors to insert a new time based data event in between existing time based data events 140 and 150 which occur at times T1 and T2, respectively. Therefore, the outcome of decision step 210 is a "NO" determination and the process continues to step 214 in which processor 102 updates the queue variable of the time based event to be inserted to point to the next time based event which immediately follows it. In this example, the queue variable of the new time based event T12 is updated to point to the next time based event occurring at time T2 (or time based data event 150). The process continues to step 216 in which processor 102 attempts to update the queue value currently associated with time based data event 140 (that is, the time based data event occurring immediately before the new time based data event) to point to the new time based data event occurring at time T12. The process continues to decision step 218 in which processor 102 determines whether the insertion of the new time based data event was successfully completed. If the outcome of decision step 218 is a "YES" determination, the process ends in step 220. If the outcome of decision step 218 is a "NO" determination, the process returns to step 202 in which the procedure is reiterated until successful insertion of the new time based data event. The above-described procedure may be concurrently implemented by multiple processors for updating a single data structure. In other words, processors 102, 106 and 110 may simultaneously update data structure 125 so long as two processors do not attempt to enter a new time based data event in exactly the same place. Indeed, a non-successful insertion indicates that at least two processors are contending to insert a time based data event in exactly the same place, in which case one processor successfully updates the structure and the other retries.

Figure 3:
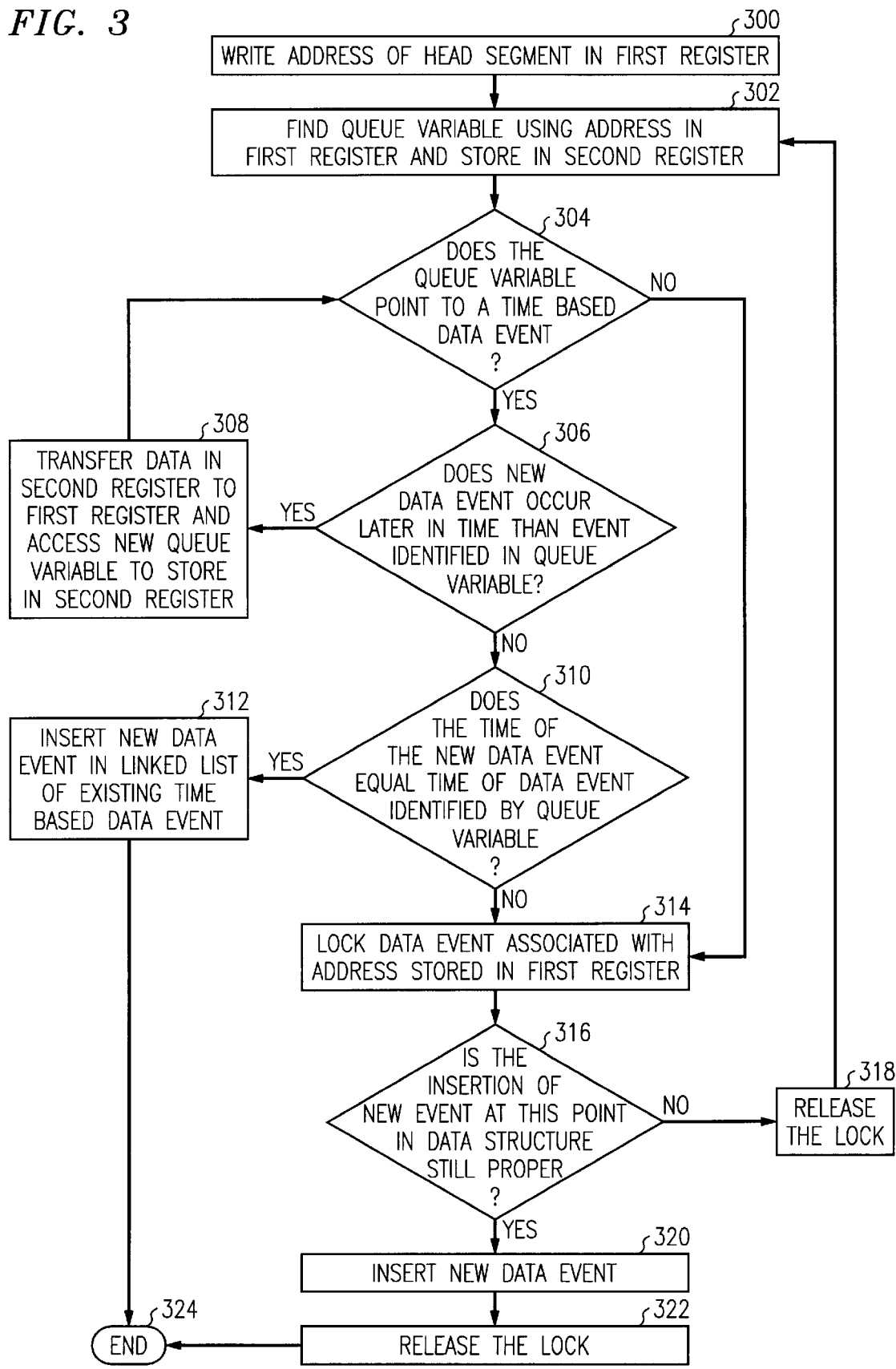
FIG. 3 is a flow diagram illustrating the steps for modifying the data structure stored in the shared local memory shown in FIG. 1 using a contention free locking mechanism.

FIG. 3 illustrates the steps performed in multiprocessor environment 100 in accordance with a protocol in which portions of a single data structure may be temporarily locked while updates occur. A substantial portion of this process is identical to the process described in FIG. 2. Accordingly, the identical steps are not discussed in great detail. The process begins in step 300 in which processor 102 writes the address associated with head segment 123 to first register 104A. In step 302, processor 102 uses the address stored in first register 104A to read and store the contents of the queue variable found in head segment 123 in second register 104B. The process continues to decision step 304 in which processor 102 determines whether the queue variable stored in register 104B has a pointer to a time based data event. If the outcome of decision step 304 is a "NO" determination, the process continues to step 314 described below. If the outcome of decision step 304 is a "YES" determination, the process continues to decision step 306 in which processor 102 determines whether the new event to be inserted into data structure 125 occurs at a later point in time than the time of the event identified by the queue variable stored in second register 104B. If the outcome of decision step 306 is a "YES" determination, the process continues to step 308 in which processor 102 assigns the contents of second register 104B to first register 104A and uses the pointer now stored in first register 104A to read and store the queue variable of the next data event in 104B. The process then returns to step 302 for iteration until the processor arrives at the place in the data structure at which the time of the new event is no longer later than the time of the event currently associated with the queue variable stored in register 104B. If the outcome of decision step 306 is a "NO" determination, the process continues to step 310 in which processor 102 determines whether the time of the new event to be inserted into data structure 125 is equal to the time of the event currently identified by the queue variables stored in second register 104B. If the outcome of decision step 310 is a "YES" determination, processor 102 simply inserts the new event at the head of the linked list associated with the timed based event identified by the queue variables stored in second register 104B. In other words, processor 102 inserts a sub-event in an existing time-based data event. If the outcome of decision step 310 is a "NO" determination, the process continues to step 314 in which processor 102 locks the time-based data event identified by the address stored in first register 104A of processor 102 and the process ends in step 324. The process continues to decision step 316 in which processor 102 determines whether the place in the data structure at which the new time-based data event is to be inserted is still proper. Decision step 316 accounts for those situations in which processor 102 is preceded by another processor which has inserted its new time-based data event at precisely the same position at which processor 102 wishes to insert its own new time-based data event. If the outcome of decision step 316 is a "NO" determination, processor 102 releases the lock in step 318 and the process returns to step 302 so that the procedure may be reiterated. If the outcome of decision step 316 is a "YES" determination, the process continues to step 320 in which processor 102 inserts the new time-based data event between the time-based data event identified by the address stored in first register 104A and the time-based data event identified by the address of the pointer associated with the queue variable information stored in second register 104B. The process continues to step 322 in which processor 102 releases the lock and the process ends in step 324. Advantageously, the above-described process enables multiple processors to concurrently access and update data structure 125 as long as each processor attempts to insert new data events in discrete locations.

Figure 4:
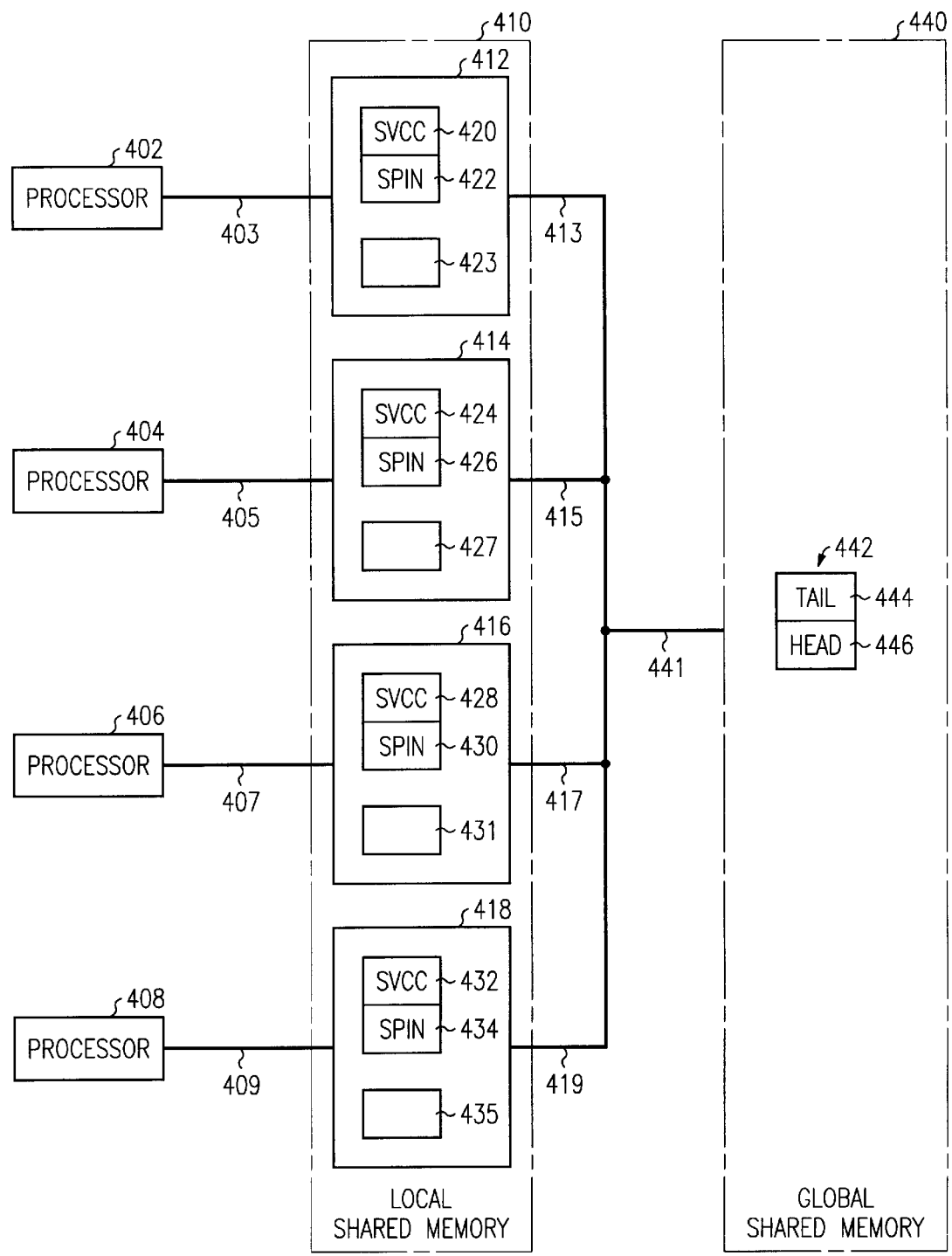
FIG. 4 is a simplified block diagram of an exemplary multiprocessor environment including a local shared memory and a globally shared locking mechanism.

FIG. 4 is simplified block diagram of a multiprocessor environment which shares a locking mechanism. More particularly, multiprocessor environment 400 comprises processors 402, 404, 406 and 408 which are linked to local shared memory 410 via designated links 403, 405, 407 and 409, respectively. Locally shared memory 410 is comprised of discrete memory segments which are associated with each of the processors in multiprocessor environment 400. In this embodiment, discrete memory segment 412 is associated with processor 402 and includes successor variable 420, spin variable 422 and register 423. Similarly, data segment is associated with processors 404 and includes successor variable 424, spin variable 426 and register 427. Data segment 416 serves processor 406 and includes successor variable 428, spin variable 430 and register 431. Data segment 418 is associated with processor 408 and includes successor variable 432, spin variable 434 and register 435. Local shared memory 410 is interconnected to globally shared memory 440 via data link 441. In this embodiment, data link 441 is also interconnected to each of the discrete data segments via a designated link. More particularly, data links 413, 415, 417 and 419 interconnect data segments 412, 414, 416 and 418, respectively, to data link 441. Global shared memory 440 includes locking mechanism 442 which is comprised of tail variable 444 and head variable 446. In the preferred embodiment, tail variable 444 includes address information identifying the last processor in the queue waiting to acquire lock 442. Head variable 446 includes pointer information for identifying a processor waiting to acquire lock 442. If the lock is available, tail variable 444 points to the head variable and the value in head variable 446 indicates the lock is free.

Each data segment within local shared memory 410 includes information used by its associated processor for acquiring lock 442 in global shared memory 440. A first variable called a "successor" variable identifies the processor, and can be modified to indicate that the processor is using or waiting for lock mechanism 442. A second variable referred to as "spin" variable indicates that the processor associated with this variable is waiting to acquire lock 442.

Figure 5:
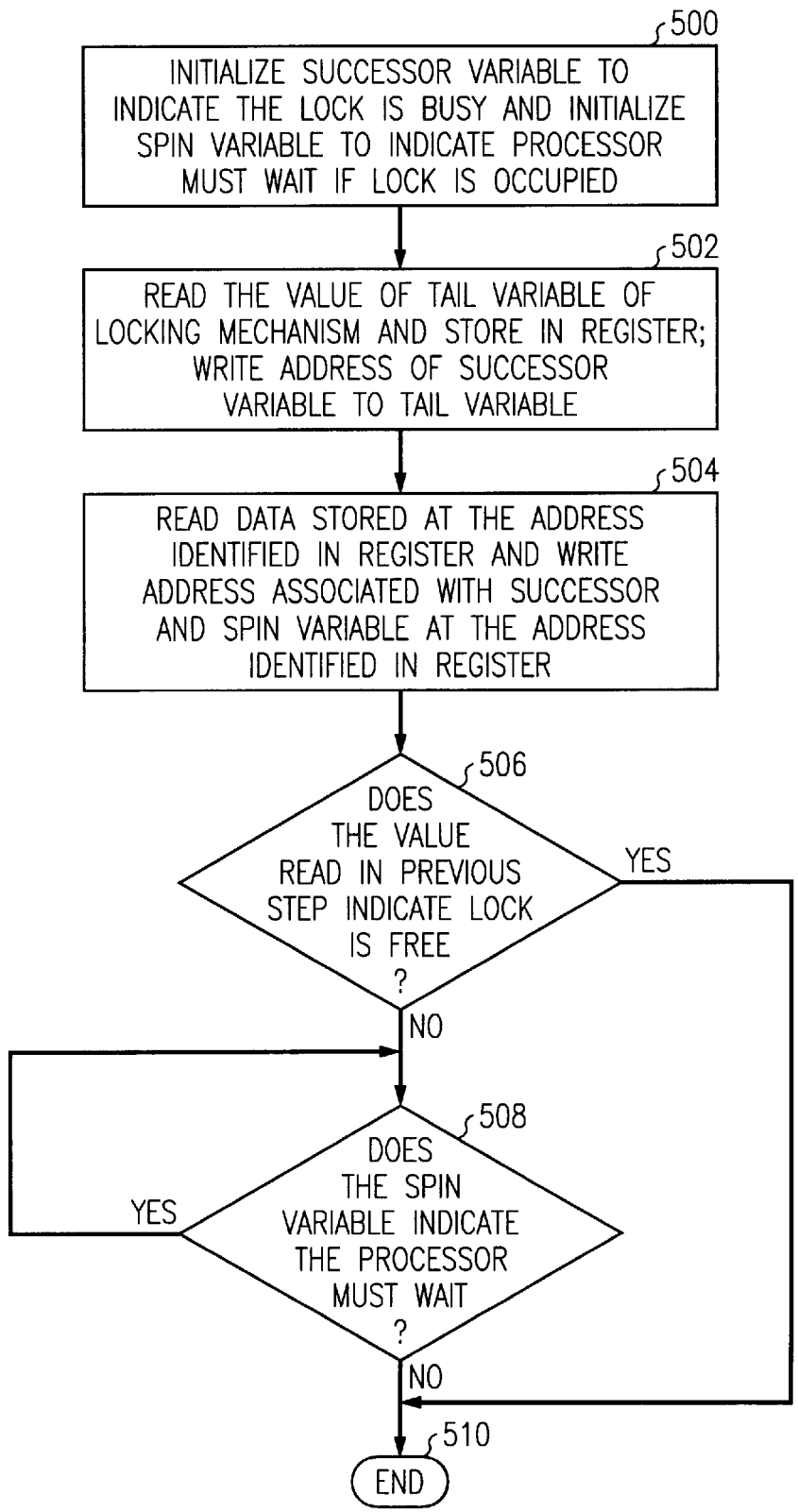
FIG. 5 is a flow diagram illustrating the steps for acquiring the locking mechanism shown in FIG. 4.

The steps required by a processor in multiprocessor environment 400 to acquire lock mechanism 442 is described in FIG. 5. For purposes of example, assume processor 402 wishes to acquire locking mechanism 442 so that it may update a data structure (not shown). The processor begins in step 500 in which processor 402 initializes its successor variable 420 to indicate that locking mechanism 442 is busy. Simultaneously, processor 402 initializes spin variable 422 to indicate that the processor must wait in the event that locking mechanism 442 is occupied. The successor variable and the spin variable are initialized prior to acquiring locking mechanism 442 in the event that the lock is occupied as described below. The process continues to step 502 in which processor 402 reads the value of tail variable 444 of locking mechanism 442 and stores it in register 423. Simultaneously, processor 402 writes the address of its successor variable 420 to tail variable 444. In step 504, processor 402 reads the data stored at the address identified in register 423 and writes the address associated with successor variable 420 and spin variable 422 at the address identified in register 423.

The process continues to decision step 506 in which processor 402 determines whether the value read in previous step 504 indicates that the lock is free. If the outcome of decision step 506 is a "YES" determination, the process ends in step 510. If the outcome of decision step 506 is a "NO" determination, the process continues to decision step 508 in which processor 402 reads spin variable 422 to determine whether the processor must wait for the lock. If the outcome of decision step 508 is a "YES" determination, step 508 is repeated until the outcome is a "NO" determination indicating that the waiting process has ended in step 510. At the end of the waiting process, processor 402 has acquired locking mechanism 442.

Figure 6:
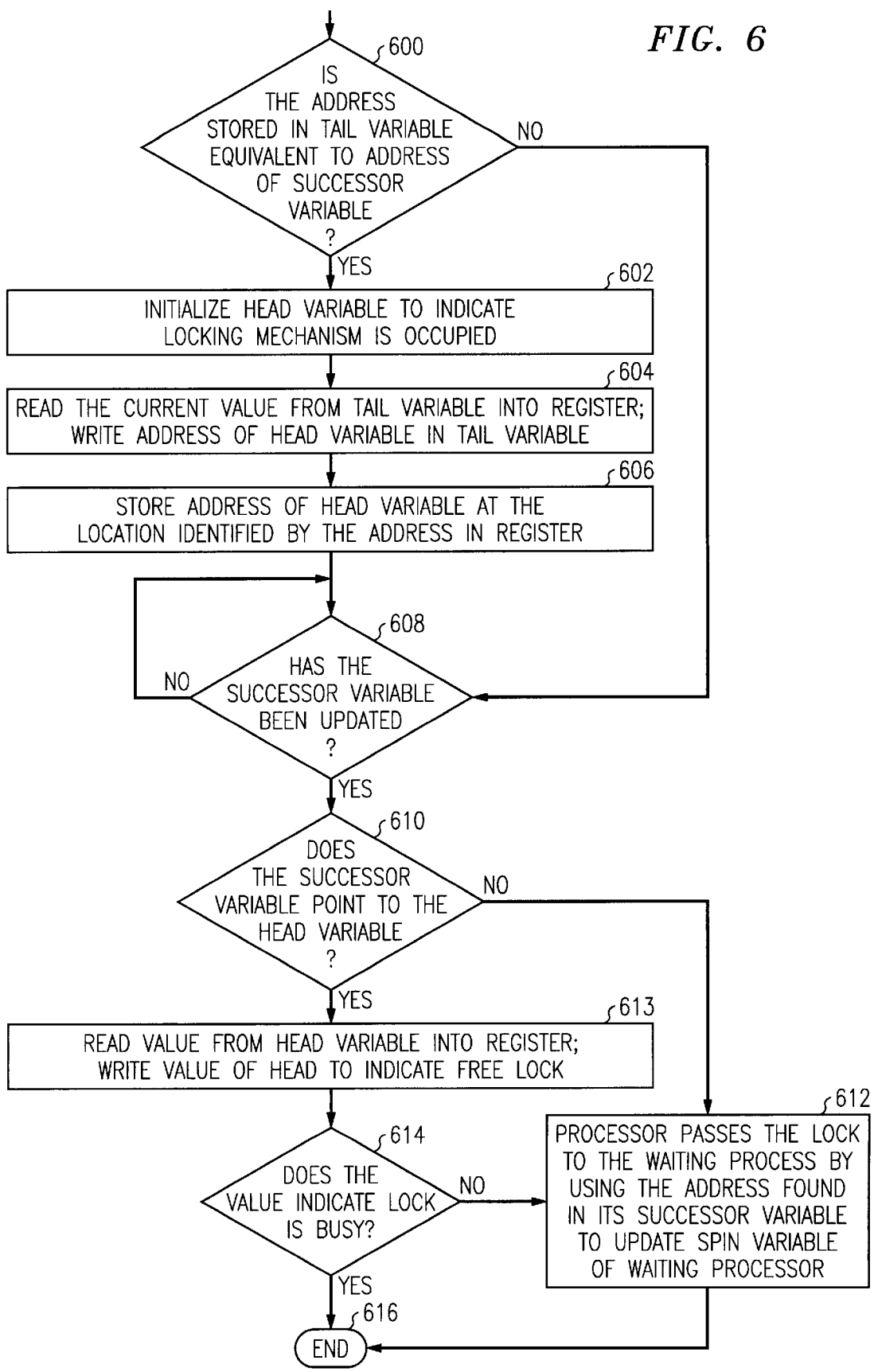
FIG. 6 is a flow diagram illustrating the steps for releasing the locking mechanism shown in FIG. 4.

FIG. 6 is a flow diagram illustrating the steps performed by a processor in multiprocessor environment 400 when releasing locking mechanism 442. For purposes of example, assume processor 402 is currently occupying locking mechanism 442. The processor begins in decision step 600 in which processor 402 determines whether the address currently stored in the tail variable is equivalent to the address of its successor variable 420. If the value of tail variable 444 is the same as the address of its successor variable 420, processor 402 is at the end of the lock acquisition queue. If the outcome of decision step 600 is a "NO" determination, the processor continues to decision step 608 described below. If the outcome of decision step 600 is a "YES" determination, the process continues to step 602 in which processor 402 initializes head variable 446 to indicate that locking mechanism 442 is currently busy. In step 604, the processor 402 reads the current value from tail variable 444 into register 423 and simultaneously writes the address of head variable 446 in tail variable 444. In step 606, processor 402 stores the address of head variable 446 at the location identified by the address in register 423.

In decision step 608, processor 402 determines whether its successor variable 420 has been updated. If the outcome of decision step 608 is a "NO" determination, the process continues until the outcome of the decision step is a "YES" determination. A "YES" determination causes the process to proceed to decision step 610 in which processor 402 determines whether successor variable 420 points to head variable 446. If the outcome of decision step 610 is a "NO" determination, another processor is waiting to acquire the lock. The process continues to step 612 in which processor 402 passes the lock to the waiting process by using the address found in its successor variable to update the spin variable of the waiting processor. If the outcome of decision step 610 is a "YES" determination, the process continues to step 613 in which processor 402 reads the value from head variable 446 into register 423 and simultaneously writes a value into head variable 446 indicating the lock is free. Decision step 614 determines whether the value read from register 423 indicates the lock is busy (that is, the processor determines if it is the same value it initialized in step 602 to indicate a busy lock). If the outcome of decision step 614 is a "YES" determination, the process ends in step 616 and the lock is now free. If the outcome is a "NO" determination, the process continues to step 612 described above. Advantageously, locking mechanism 442 maintains the FIFO behavior of lock acquisition by exchange of information via the successor and spin variables using swap as the only atomic primitive.

Although the invention is described with respect to preferred embodiments, those skilled in the art may devise numerous other arrangements without departing from the scope of the invention.

What is claimed is:

1. In a multiprocessor environment including a locking mechanism shared by multiprocessors, a method for releasing the locking mechanism comprises the step of:

determining whether data stored in a first variable of the locking mechanism is the same as an address of a second variable of an occupying processor;

determining whether the second variable associated with the occupying processor is updated; and, updating a variable associated with a waiting processor, wherein updating the variable releases the locking mechanism on a first-in, first-out basis without passing the release information to other processors.

\* \* \* \* \*